(12) United States Patent
Austin et al.

(10) Patent No.: US 6,630,199 B1
(45) Date of Patent: Oct. 7, 2003

(54) CERAMIC LAYER PRODUCED BY REACTING A CERAMIC PRECURSOR WITH A REACTIVE GAS

(75) Inventors: Curtiss Mitchell Austin, Loveland, OH (US); Richard John Grylls, Loveland, OH (US)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 09/709,022

(22) Filed: Nov. 8, 2000

(51) Int. Cl.$^7$ .................. C23C 16/40; C23C 16/44; C04B 35/10

(52) U.S. Cl. .......... 427/255.19; 427/245; 427/255.18; 427/255.26; 427/255.34; 427/255.37; 427/255.4; 427/264; 427/419.3; 501/128

(58) Field of Search .......... 427/255.11, 255.12, 427/255.15, 255.18, 255.19, 255.21, 255.26, 255.31, 255.34, 255.37, 243, 245, 255.27, 255.4, 264, 270, 271, 419.3, 255.17, 255.32; 501/127, 128, 133

(56) References Cited

U.S. PATENT DOCUMENTS

| | | | |
|---|---|---|---|
| 4,670,320 A | * 6/1987 | Yamaguchi et al. | 216/103 |
| 4,673,435 A | * 6/1987 | Yamaguchi et al. | 419/19 |
| 5,214,011 A | 5/1993 | Breslin | 501/127 |
| 5,216,808 A | * 6/1993 | Martus et al. | 29/889.1 |
| 5,405,242 A | * 4/1995 | Auxier et al. | 415/115 |
| 5,518,061 A | 5/1996 | Newkirk et al. | 164/97 |
| 5,543,635 A | * 8/1996 | Nguyen et al. | 257/65 |
| 5,683,761 A | * 11/1997 | Bruce et al. | 427/255.7 |
| 5,728,638 A | 3/1998 | Strange et al. | 501/127 |
| 5,767,032 A | * 6/1998 | Hokkanen et al. | 502/104 |
| 6,037,013 A | * 3/2000 | Hsu et al. | 427/535 |

FOREIGN PATENT DOCUMENTS

GB   1196475 A   * 6/1970

* cited by examiner

Primary Examiner—Shrive P. Beck
Assistant Examiner—Wesley Markham
(74) Attorney, Agent, or Firm—Gregory Garmong; Kurt L. Ehresman; McNees Wallace & Nurick LLP

(57) ABSTRACT

A structure protected by a ceramic coating is prepared by providing a substrate having a surface, and depositing a layer of a sacrificial ceramic precursor material, preferably silica, onto the surface of the substrate. The method further includes furnishing a reactive gas, preferably an aluminum-containing gas, that is reactive with the sacrificial ceramic to produce a protective ceramic different from the sacrificial ceramic, and contacting the reactive gas to the layer of the precursor material to produce a protective ceramic layer.

21 Claims, 3 Drawing Sheets

CERAMIC LAYER PRODUCED BY REACTING A CERAMIC PRECURSOR WITH A REACTIVE GAS

This invention relates to ceramic coatings on substrates, and, more particularly, to aircraft gas turbine components protected by such coatings.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. In a more complex version of the gas turbine engine, the compressor and a high pressure turbine are mounted on one shaft, and a bypass fan and low pressure turbine are mounted on a separate shaft. In any event, the hot exhaust gases flow from the back of the engine, driving it and the aircraft forwardly.

The hotter the combustion and exhaust gases, the more efficient is the operation of the jet engine. There is therefore an incentive to raise the combustion and exhaust gas temperatures. The maximum temperature of the combustion gases is normally limited by the materials used to fabricate the hot-section components of the engine. These components include the turbine vanes and turbine blades of the gas turbine, upon whose airfoil sections the hot combustion gases directly impinge. In current engines, the turbine vanes and blades are made of nickel-based superalloys, and can operate at temperatures of up to about 1800–2100° F. These components are also subject to damage by oxidation and corrosive agents, as well as impact damage and erosion by particles entrained in the combustion gas stream.

Many approaches have been used to increase the operating temperature limit and service lives of the turbine blades and vanes to their current levels, while achieving acceptable oxidation, corrosion, erosion, and impact resistance. The composition and processing of the base materials themselves have been improved. Cooling techniques are used, as for example providing the component with internal cooling passages through which cooling air is passed.

In another approach used to protect the hot-section components, the surfaces of the turbine blades and vanes are coated with thermal barrier coating systems. The thermal barrier coating systems typically include a bond coat that contacts the substrate, and a ceramic thermal barrier coating (TBC) layer overlying the bond coat. The bond coat protects the articles against the oxidative and corrosive effects of the combustion gas. The ceramic layer provides thermal insulation and erosion/impact damage resistance. The turbine blades and turbine vanes are thereby able to run cooler and are more resistant to environmental attack in the presence of the thermal barrier coating systems.

Although the thermal barrier coating approach is operable, there is opportunity for improvement. It would be desirable to improve the thermal insulation properties of the ceramic thermal barrier coating, as well as to increase its resistance to impact damage. The present invention fulfills this need, and further provides related advantages.

BRIEF SUMMARY OF THE INVENTION

The present invention provides a structure in which a substrate is protected by an overlying ceramic layer. The substrate may be a component of a gas turbine engine such as a turbine blade or turbine vane. The ceramic layer has improved insulation properties as compared with prior ceramic layers, as well as improved resistance to impact damage. The ceramic layer of the invention is compatible with the use of bond coats, and in some circumstances dispenses with the need for a bond coat.

A method of preparing a structure protected by a ceramic coating comprises the steps of providing a substrate having a surface, and depositing a layer comprising a precursor material onto the surface of the substrate. The precursor material comprises a sacrificial ceramic. The method further includes furnishing a reactive gas, the reactive gas being reactive with the sacrificial ceramic to produce a protective ceramic different from the sacrificial ceramic, and thereafter contacting the reactive gas to the layer comprising the precursor material to produce a protective ceramic layer.

Preferably, the sacrificial ceramic is silica, and the reactive gas comprises an aluminum-containing gas such as aluminum chloride gas. The resulting protective ceramic comprises alumina. Desirably, the protective ceramic layer also comprises at least about 20 percent by volume of intraceramic space, which may be empty and porous, or filled partially with metal.

The present approach is compatible with further treatments, such as the formation of a bond coat layer on the surface of the substrate. A layer of an additional material, such as a ceramic sealing layer, may overlie the protective ceramic layer.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
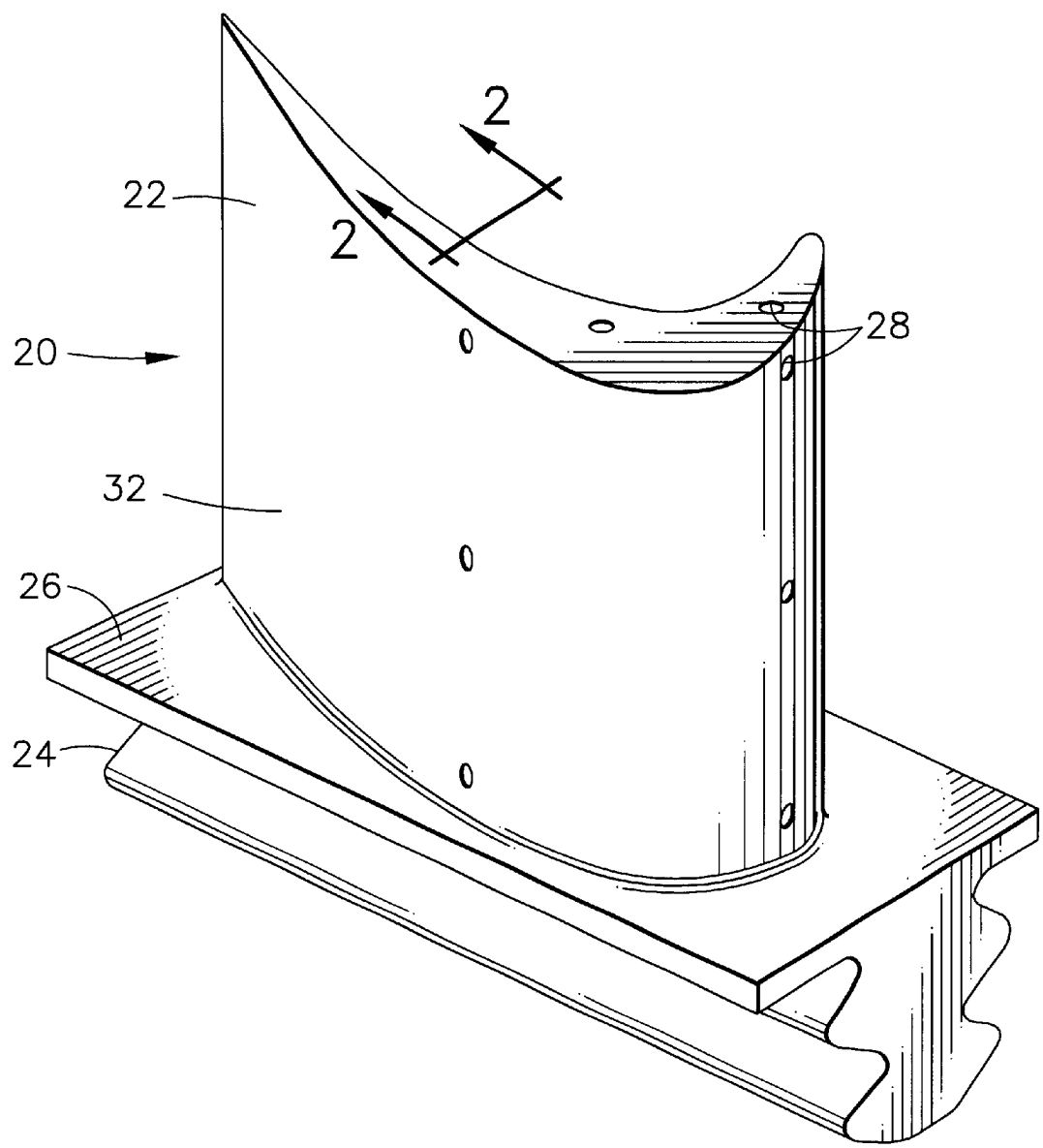
FIG. 1 is a perspective view of a turbine blade.

FIG. 1 depicts a gas turbine engine component such as a turbine blade or turbine vane, and in this illustration a turbine blade 20. The turbine blade 20 is preferably formed of a nickel-base superalloy. The turbine blade 20 includes an airfoil 22 against which the flow of hot exhaust gas is directed. (The turbine vane has a similar appearance in respect to the pertinent airfoil portions.) The turbine blade 20 is mounted to a turbine disk (not shown) by a dovetail 24 which extends downwardly from the airfoil 22 and engages a slot on the turbine disk. A platform 26 extends laterally outwardly from the area where the airfoil 22 is joined to the dovetail 24. A number of internal passages extend through the interior of the airfoil 22, ending in openings 28 in the surface of the airfoil 22. A flow of cooling air is directed through the internal passages, to reduce the temperature of the airfoil 22. A thermal barrier coating 32 is applied to at least some portions of the airfoil 22.

Figure 2:
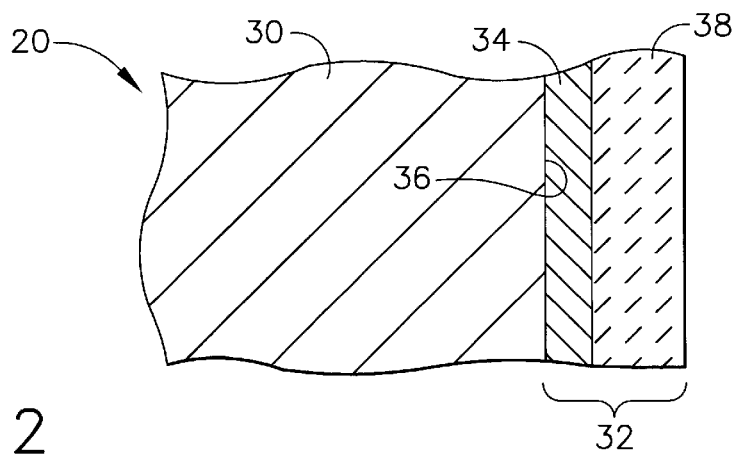
FIG. 2 is an enlarged schematic sectional view through the turbine blade of FIG. 1, illustrating the coating structure.

FIG. 2 depicts in enlarged sectional view a region of the turbine blade 20, which serves as a substrate 30 for a thermal barrier coating system 32. The thermal barrier coating system 32 includes a bond coat layer 34 bonded to a surface 36 of the substrate 30. The bond coat layer 34, which may be omitted in some circumstances, may be of any type known in the art. Examples include simple diffusion aluminides, diffusion aluminides modified with the addition of alloying elements such as platinum, or overlay bond coats such as MCrAl(X)-type overlay bond coats.

A protective layer of a ceramic coating 38, which may also be described as a ceramic thermal barrier coating, is bonded to the bond coat layer 34 and thence to the substrate 30. The preparation of the protective ceramic layer 38 will be described in detail subsequently. The ceramic material comprises a base ceramic such as aluminum oxide or zirconia, optionally modified with the addition of a modifying ceramic. Any compatible modifying ceramic may be used to achieve particular properties in the ceramic region, with the modifying ceramic present in any operable amount. For example, the modifying ceramic may be a ceramic material that is harder and more abrasive than the base ceramic. An example of an abrasive modifying ceramic that is more abrasive than the base ceramic and may be mixed with the base ceramic is boron nitride. The modifying ceramic may be a ceramic material that is more abradable than the base ceramic. Examples of abradable modifying ceramics that are more abradable than aluminum oxide and may be mixed with the base ceramic include silicon carbide and silicon nitride.

Figure 3:
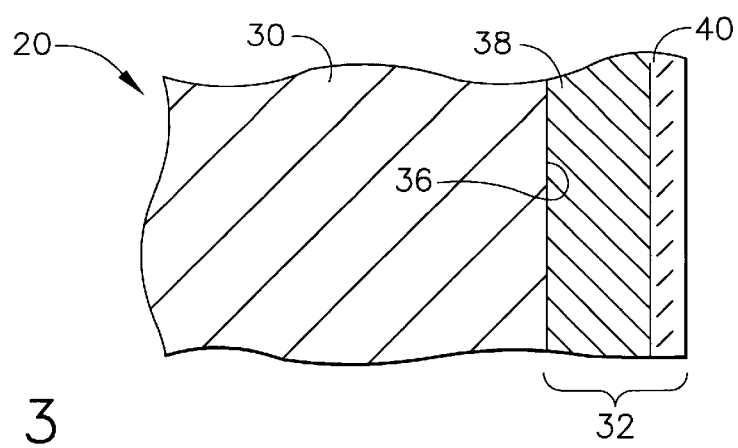
FIG. 3 is an enlarged schematic sectional view like that of FIG. 2, illustrating another coating structure.

FIG. 3 depicts a similar structure with the bond thermal barrier coating system 32, except that in this case the bond coat layer 34 is omitted and an additional layer 40 is deposited overlying the protective ceramic layer 38. The additional layer 40 may be of any operable type. The additional layer 40 may be an infiltrated metal or a ceramic. The additional metal layer, where present, is preferably aluminum or a nickel-base alloy such as a nickel-base superalloy. The additional ceramic layer, where present, is preferably of the same chemical type as the ceramic of the protective ceramic layer 38, but is preferably an additional ceramic material that has little porosity therein. The features of FIGS. 2 and 3 may be mixed, as long as they are compatible. For example, the additional ceramic layer may be applied overlying the ceramic protection layer 38 of FIG. 2.

The layers 34, 38, and 40 may be of any operable thickness. The layer 34 is preferably from about 0.0005 to about 0.005 inches in thickness, the layer 38 is preferably from about 0.005 to about 0.025 inches in thickness, and the layer 40 is preferably from about 0.0005 to about 0.005 inch in thickness.

Figure 4:
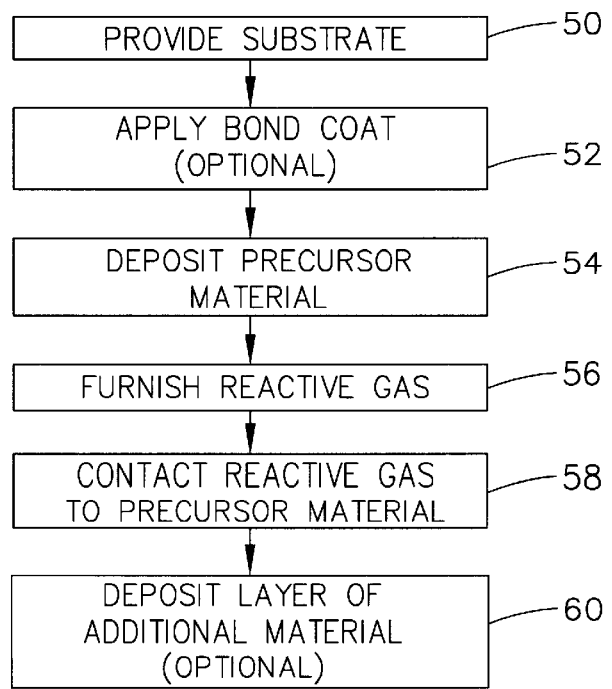
FIG. 4 is a block flow diagram of an approach for producing the coating structure.

FIG. 4 is a block flow diagram depicting a preferred approach for practicing the method of the invention. The substrate 30 is provided, numeral 50. The substrate 30 is preferably a component of a gas turbine engine, such as a turbine blade 20 or a turbine vane, and more specifically the airfoil 22 of the turbine blade or turbine vane. The substrate is prepared by techniques known in the art, such as the equiaxed solidification or directional solidification techniques known in the art. The substrate is preferably, but not necessarily, made of a nickel-base superalloy. The "nickel-base" alloy has more nickel than any other element. The alloy is a superalloy because it is strengthened by a gamma-prime or gamma-double-prime precipitate structure. A typical nickel-base alloy lies within compositional ranges, in weight percent, of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities.

The bond coat layer 34 is optionally applied, numeral 52. The bond coat layer is applied by a technique appropriate to the bond coat chosen, and such techniques are known in the art. In the case of a simple diffusion aluminide bond coat, an aluminum layer is deposited and interdiffused with the substrate. In the case of a platinum-modified aluminide bond coat, a platinum layer is first deposited electrochemically, and then an aluminum layer is deposited and interdiffused with the platinum layer and the substrate. In the case of an overlay bond coat, the overlay is deposited by physical vapor deposition or other operable technique.

A layer of a precursor material is deposited, numeral 54. The precursor material comprises a sacrificial ceramic that is later reacted to produce the protective ceramic layer 38. The sacrificial ceramic layer preferably comprises silica (silicon dioxide or $SiO_2$). This material is termed a "sacrificial" ceramic because it is consumed during the subsequent reaction process. Silica may be deposited in the required thickness of the ceramic coating 38 by any operable technique, such as the application of a slip slurry of silicon dioxide frit in a carrier by painting, dipping or spraying; plasma spraying of silicon dioxide; or chemical vapor deposition. Any modifying ceramics may be mixed with the precursor material and co-deposited with the precursor material. The deposited silica (and the modifying ceramics, if any) may be dried and fired by heating the deposit to a temperature of about 2000° F. for a period of about 4 hours. The layer of the precursor material is of about the same thickness as desired in the final protective ceramic layer 38.

A reactive gas is furnished, numeral 56. The reactive gas is reactive with the sacrificial ceramic to produce a protective ceramic different from the sacrificial ceramic. The sacrificial ceramic and the reactive gas are cooperatively selected to produce the desired protective ceramic. The reactive gas is preferably an aluminum-containing gas, as the most preferred protective ceramic is alumina (aluminum oxide, $Al_2O_3$). A most preferred aluminum-containing gas is aluminum chloride (also known as aluminum trichloride, $AlCl_3$). Aluminum chloride chemically reacts with silica, by a reaction that is believed to be generally of the form:

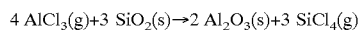

$$4\ AlCl_3(g) + 3\ SiO_2(s) \rightarrow 2\ Al_2O_3(s) + 3\ SiCl_4(g)$$

The reactive gas also desirably comprises hydrogen gas, which reacts with any remaining silicon to produce silane gas that is carried away.

The reactive gas is contacted to the layer of the precursor material, numeral 58. The aluminum chloride gas reacts with the silica to produce alumina that replaces the silica in the layer of the precursor material, and the silicon-containing gas which is released. The modifying ceramics, if any, remain largely unreacted and mixed into the reacted ceramic, in this case the alumina. Porosity is also produced in the ceramic phase due to the difference in the volumes of the silica and alumina phases. Aluminum metal may fill some portion of the porosity. The conditions of the contacting step 58 depend upon the selected precursor material and reactive gas. In the case of the silica precursor material and the aluminum chloride reactive gas, the preferred temperature of the contacting gas is from about 1900° F. to about 2150° F., with a contacting time of from about 4 hours to about 8 hours for a typical layer about 0.005 inch thick.

The resulting structure is desirably porous, with at least about 20 volume percent porosity in the ceramic protective layer 38. Preferably, there is from about 20 to about 40 volume percent porosity in the ceramic protective layer 38. The porosity in the ceramic protective layer 38 is desirable, as it releases thermal strains which otherwise may tend to cause the ceramic protective layer 38 to spall off the substrate 30. Some or all of the porosity may have metal therein.

The layer 40 of the additional material may optionally be deposited overlying the reacted protective ceramic layer 38, numeral 60. The additional layer 40 may be, for example, a metal that is infiltrated into the porosity of the protective ceramic layer 38. The infiltrated metal may be a nickel-base superalloy of the type discussed earlier, or it may be an aluminum-base material to provide oxidation protection. The additional layer 40 may be a ceramic material, such as dense alumina or yttria-stabilized zirconia (YSZ), to seal the porosity of the ceramic protective layer 38. The additional layer 40 is deposited by any operable technique for the selected deposited material. For example, metals may be deposited by vapor deposition or liquid-metal infiltration, and ceramics may be deposited by physical vapor deposition.

Figure 5:
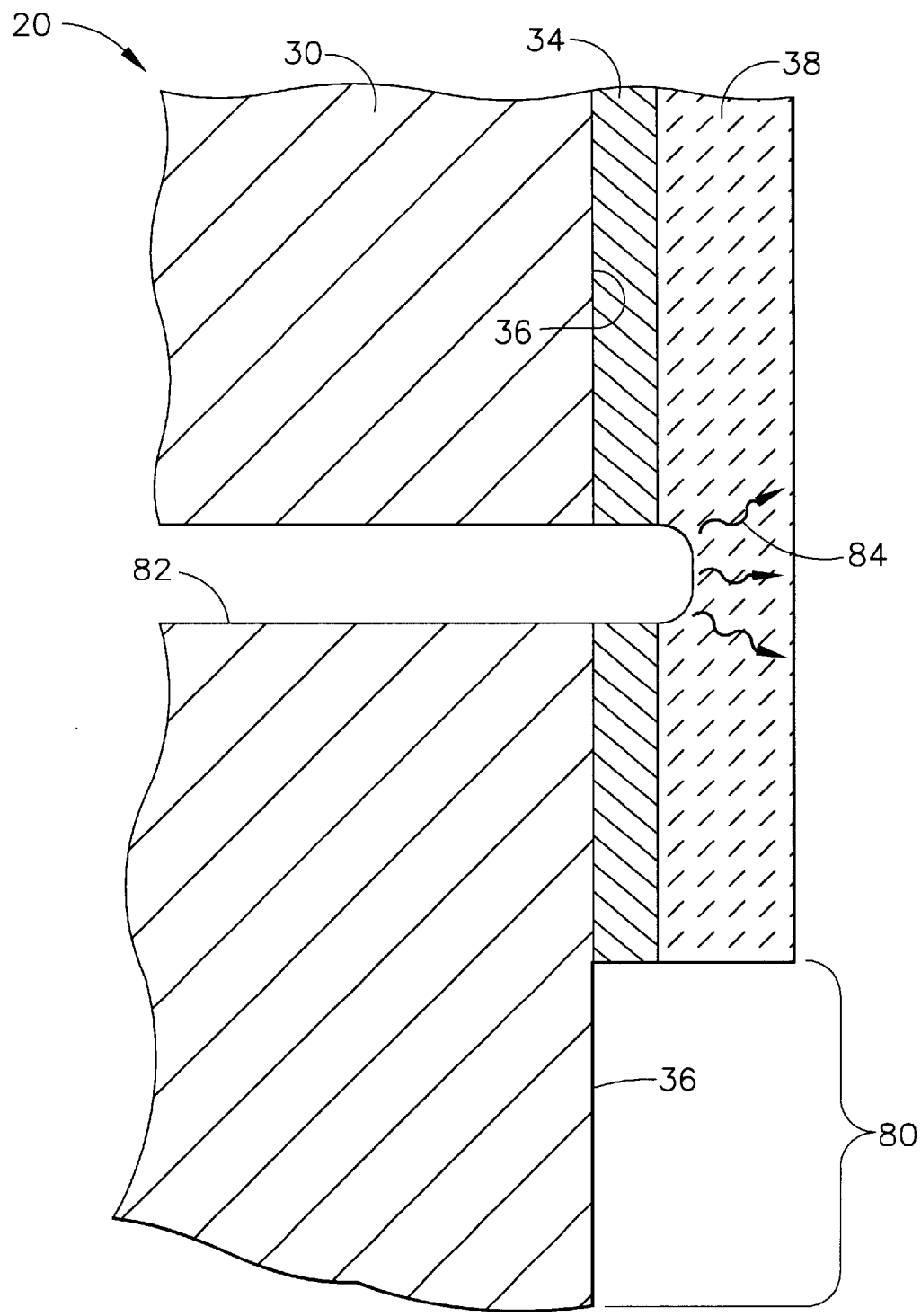
FIG. 5 is a schematic sectional view of the turbine blade with a patterned ceramic coating layer.

The present approach offers great flexibility to form protected structures of various arrangements. FIG. 5 illustrates two further possibilities. In an unprotected region 80, no bond coat 34 or ceramic coating 38 is applied, leaving the surface 36 completely bare. This structure is achieved by masking the region 80 during deposition of the layer of precursor material, or by forming the protective structure and later removing it in the region 80. A bare surface is sometimes required to permit braze attachments and the like to the substrate 30.

In another option, a cooling-air passage 82 is drilled from the back side or interior of the turbine blade 20, through the optional bond coat 34, and into the back side of the ceramic layer 38. During service, cooling air is forced through the passage 82 and diffuses out through the porosity of the ceramic layer 38 as indicated by gas-flow arrows 84. The result is that the turbine blade 20 is cooled by transpiration cooling, rather than (or in addition to) the conventional cooling approach with the openings 28 of FIG. 1. Transpiration cooling is expected to be more effective in some applications and locations on the turbine blade, because it allows a greater contact time of the cooling air to the interior surfaces of the turbine blade and is more effective in forming a film cooling layer with the gas that flows out through the porosity of the ceramic layer.

With the most preferred embodiment of the present approach, the exteriorly facing portion of the ceramic coating 38 which is exposed to the hot combustion gas is a porous ceramic structure. This structure has several important advantages. The porosity imparts compliance to the ceramic coating 38, which permits it to flex under the influence of extensions of the turbine blade 20 during service and under the influence of thermal cycling strains. The tendency of the ceramic coating to spall away during service is thereby reduced. The porous ceramic structure also resists impact damage better than does a monolithic ceramic structure, because impact energy may be absorbed by localized crushing and compaction of the porous ceramic, rather than by crack propagation that causes spallation. The porous structure reduces the thermal conductivity of the ceramic material, as compared with its monolithic form. Some existing ceramic layers produced by known processes have small amounts of porosity, such as 5 percent by volume or less. The present approach is distinguished from these prior approaches by the greater amount of porosity.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method of preparing a structure protected by a ceramic coating, comprising the steps of providing a substrate having a surface, wherein the substrate comprises a component of a gas turbine engine;

depositing a layer comprising a precursor material onto the surface of the substrate, the precursor material comprising a silica sacrificial ceramic; and furnishing an aluminum-containing reactive gas, the aluminum-containing reactive gas being reactive with the silica sacrificial ceramic to produce a protective ceramic different from the silica sacrificial ceramic; and thereafter reacting the reactive gas with the layer comprising the precursor material to produce a protective ceramic layer, wherein the protective ceramic layer further comprises porosity.

2. The method of claim 1, including an additional step, after the step of providing and prior to the step of depositing, of applying a bond coat layer on the surface of the substrate.

3. The method of claim 1, wherein there is a modifying ceramic mixed with the sacrificial ceramic in the step of depositing.

4. The method of claim 1, wherein the reactive gas further comprises hydrogen gas.

5. The method of claim 1, wherein the reactive gas comprises aluminum chloride gas.

6. The method of claim 1, including an additional step, after the step of reacting, of depositing a layer of an additional material overlying the protective ceramic layer.

7. The method of claim 1, wherein the protective ceramic layer comprises from about 20 to about 40 percent by volume of porosity.

8. The method of claim 1, wherein at least a portion of the porosity is filled with a metal.

9. A method of preparing a structure protected by a ceramic coating, comprising the steps of providing a gas turbine blade made of a nickel-base alloy and having a surface;

depositing a layer comprising a silica precursor material onto the surface of the gas turbine blade;

furnishing an aluminum-containing reactive gas, the reactive gas being reactive with the silica precursor material to produce an alumina ceramic; and thereafter reacting the reactive gas with the layer comprising the silica precursor material to produce a protective ceramic layer comprising the alumina ceramic.

10. The method of claim 9, including an additional step, after the step of providing and prior to the step of depositing, of forming a bond coat layer on the surface of the gas turbine blade.

11. The method of claim 9, including an additional step, after the step of reacting, of depositing a layer of an additional material overlying the protective ceramic layer.

12. The method of claim 9, including an additional step of drilling a cooling-air passage into a back side of the protective ceramic layer.

13. A method of preparing a structure protected by a ceramic coating, comprising the steps of providing a substrate comprising a component of a gas turbine engine made of a nickel-base alloy and having a surface;

depositing a layer comprising a silica precursor material onto the surface of the substrate;

furnishing a reactive gas comprising an aluminum-containing gas, the reactive gas being reactive with the layer comprising the silica precursor material to produce a protective ceramic different from the layer comprising the silica precursor material; and thereafter reacting the reactive gas with the layer comprising the precursor material to produce a protective ceramic layer.

14. The method of claim 13, including an additional step, after the step of providing and prior to the step of depositing, of forming a bond coat layer on the surface of the substrate.

15. The method of claim 13, wherein the reactive gas further comprises hydrogen gas.

16. The method of claim 13, including an additional step, after the step of reacting, of depositing a layer of an additional material overlying the protective ceramic layer.

17. A method of preparing a structure protected by a ceramic coating, comprising the steps of providing a substrate having a surface, wherein the substrate comprises a component of a gas turbine engine;

depositing a layer comprising a precursor material onto the surface of the substrate, the precursor material comprising a silica sacrificial ceramic; and finishing a reactive gas, the reactive gas being reactive with the sacrificial ceramic to produce a protective ceramic different from the sacrificial ceramic, wherein the protective ceramic comprises alumina; and thereafter reacting the reactive gas with the layer comprising the precursor material to produce a protective ceramic layer, wherein the protective ceramic layer further comprises porosity.

18. The method of claim 17, wherein the protective ceramic layer comprises from about 20 to about 40 percent by volume of porosity.

19. The method of claim 17, wherein at least a portion of the porosity is filled with a metal.

20. A method of preparing a structure protected by a ceramic coating, comprising the steps of providing a substrate having a surface, wherein the substrate comprises a nickel-base alloy;

depositing a layer comprising a precursor material onto the surface of the substrate, the precursor material comprising a silica sacrificial ceramic; and furnishing an aluminum-containing reactive gas, the aluminum-containing reactive gas being reactive with the silica sacrificial ceramic to produce a protective ceramic different from the silica sacrificial ceramic; and thereafter reacting the reactive gas with the layer comprising the precursor material to produce a protective ceramic layer, wherein the protective ceramic layer further comprises porosity.

21. A method of preparing a structure protected by a ceramic coating, comprising the steps of providing a substrate having a surface, wherein the substrate comprises a nickel-base alloy;

depositing a layer comprising a precursor material onto the surface of the substrate, the precursor material comprising a silica sacrificial ceramic; and furnishing a reactive gas, the reactive gas being reactive with the sacrificial ceramic to produce a protective ceramic different from the sacrificial ceramic, wherein the protective ceramic comprises alumina; and thereafter reacting the reactive gas with the layer comprising the precursor material to produce a protective ceramic layer, wherein the protective ceramic layer further comprises porosity.

* * * * *